United States Patent
Weatherall et al.

(10) Patent No.: US 10,201,922 B2
(45) Date of Patent: Feb. 12, 2019

(54) CONTROL STRUCTURE FOR A MOLDING SYSTEM

(71) Applicant: Husky Injection Molding Systems Ltd., Bolton (CA)

(72) Inventors: Douglas James Weatherall, Bolton (CA); Robert Domodossola, Belfountain (CA); Joachim Johannes Niewels, Thornton (CA); Ruud Maria Theodorus Luijs, Toronto (CA); Sean Farshid Sanjabi, Richmond Hill (CA)

(73) Assignee: Husky Injection Molding Systems, Inc., Bolton, Ont. (CA)

( * ) Notice: Subject to any disclaimer, the term of this patent is extended or adjusted under 35 U.S.C. 154(b) by 854 days.

(21) Appl. No.: 14/358,076

(22) PCT Filed: Nov. 16, 2012

(86) PCT No.: PCT/CA2012/050823
§ 371 (c)(1),
(2) Date: May 14, 2014

(87) PCT Pub. No.: WO2013/075232
PCT Pub. Date: May 30, 2013

(65) Prior Publication Data
US 2014/0312520 A1 Oct. 23, 2014

Related U.S. Application Data

(60) Provisional application No. 61/625,104, filed on Apr. 17, 2012, provisional application No. 61/563,059, filed on Nov. 23, 2011.

(51) Int. Cl.
*B29C 45/77* (2006.01)
*B29C 45/80* (2006.01)
*B29C 45/28* (2006.01)

(52) U.S. Cl.
CPC .......... *B29C 45/80* (2013.01); *B29C 45/2806* (2013.01); *B29C 2045/2824* (2013.01);
(Continued)

(58) Field of Classification Search
CPC .... B29C 2045/2824; B29C 2045/2865; B29C 2945/76083; B29C 2945/76274; B29C 45/2806; B29C 45/80
See application file for complete search history.

(56) References Cited

U.S. PATENT DOCUMENTS 4,828,769 A * 5/1989 Maus .................... B29C 45/263
264/1.31
5,556,582 A 9/1996 Kazmer
(Continued)

FOREIGN PATENT DOCUMENTS

EP  1447200 A2  8/2004
EP  2103409 A1  9/2009
(Continued)

OTHER PUBLICATIONS

Extended European Search Report, dated Jun. 2, 2016, 13 pages.
Partial Supplementary European Search Report, Gemeinböck Gerald, dated Oct. 26, 2015, 6 pages.

*Primary Examiner* — Yuhui R Pan (57) ABSTRACT

Disclosed herein, amongst other things, is a control structure for a molding system (900). The control structure includes a controller (106, 934) and a valve actuator (104) for positioning a valve member (102) of a valve (101) for regulating flow of molding material in the molding system (900), wherein the controller (106, 934) is configured to monitor an operating parameter of the valve actuator (104) for indirectly appreciating an indication of a molding parameter of the molding system (900).

27 Claims, 8 Drawing Sheets

(52) U.S. Cl.
CPC ............ *B29C 2045/2865* (2013.01); *B29C 2945/76083* (2013.01); *B29C 2945/76274* (2013.01); *B29C 2945/76505* (2013.01); *B29C 2945/76568* (2013.01)

(56) References Cited

U.S. PATENT DOCUMENTS

| | | | |
|---|---|---|---|
| 5,785,910 A * | 7/1998 | Sakashita | B29C 31/041 |
| | | | 264/257 |
| 6,228,309 B1 | 5/2001 | Jones et al. | |
| 6,464,909 B1 * | 10/2002 | Kazmer | B29C 45/2806 |
| | | | 264/328.8 |
| 6,767,486 B2 | 7/2004 | Doughty et al. | |
| 7,341,445 B2 | 3/2008 | Paris et al. | |
| 7,731,489 B2 | 6/2010 | Fairy | |
| 2002/0121713 A1 | 9/2002 | Moss et al. | |
| 2003/0062643 A1 * | 4/2003 | Bulgrin | B29C 45/76 |
| | | | 264/40.1 |
| 2003/0203064 A1 * | 10/2003 | Doughty | B29C 45/27 |
| | | | 425/145 |
| 2004/0185142 A1 * | 9/2004 | Olaru | B29C 45/1603 |
| | | | 425/564 |
| 2008/0305199 A1 | 12/2008 | Maruyama et al. | |
| 2008/0305201 A1 | 12/2008 | Maruyama et al. | |
| 2008/0305202 A1 | 12/2008 | Oomori et al. | |
| 2011/0291328 A1 * | 12/2011 | Vasapoli | B29C 45/2806 |
| | | | 264/328.1 |

FOREIGN PATENT DOCUMENTS

| | | |
|---|---|---|
| JP | H11309757 A | 11/1999 |
| JP | 2001205656 A | 7/2001 |
| JP | 2009039912 A | 2/2009 |
| WO | 20080011703 | 1/2008 |

* cited by examiner

CONTROL STRUCTURE FOR A MOLDING SYSTEM

TECHNICAL FIELD

Non-Limiting embodiments disclosed herein generally relate to a control structure for a molding system and a related method.

BACKGROUND

U.S. Pat. No. 5,556,582 discloses (and is not limited to) methods and apparatus in which mold material flows through a gate into a mold cavity that defines the shape of a desired part.

U.S. Pat. No. 6,228,309 discloses (and is not limited to) a method and apparatus for injection molding with multiple hot runner valve gates to fill a single large mold cavity.

United States Patent Publication Number 20020121713 discloses (and is not limited to) an injection molding machine having first and second nozzles for delivering melt material to first and second mold cavities of first and second molds respectively.

SUMMARY

During injection molding, it is advantageous to have a way of sensing whether the mold cavity is full. Various vendors offer instrumentation, such as thermocouples and pressure transducers, that may be installed in a mold cavity, and these sensors are configured to sense presence of plastic by registering either an increase in pressure or temperature. The problem is robustness of the sensors, and the fact that the sensors must be installed in the mold cavity itself, and that the size of the sensor and any associated wiring needs to be accommodated in mold assembly.

According to an aspect disclosed herein (and not limited thereto), there is provided a mold-tool system (100), comprising: a valve-stem assembly (102) for a runner assembly (916) of a molding system (900); a valve-stem actuator (104) being connected to the valve-stem assembly (102); and a controller assembly (106) being connected to the valve-stem actuator (104), the controller assembly (106) being configured to sense process of the molding system (900) responsive to forcible movements imposed to the valve-stem assembly (102) by forces acting on the valve-stem assembly (102).

According to another aspect disclosed herein (and not limited thereto), there is provided a method of operating a mold-tool system (100), the method comprising: applying a force to stems (102A, 102B, 102C) by respective stem actuators (104A, 104B, 104C), the stems (102A, 102B, 102C) being associated with mold assemblies (918A, 918B, 918C); and controlling the stem actuators (104A, 104B, 104C) such that mold-full cycles (806A, 806B, 806C) of the mold assemblies (918A, 918B, 918C) occur at the same time, within an acceptable level of tolerance.

According to another aspect disclosed herein (and not limited thereto), there is provided a control structure for a molding system (900). The control structure includes a controller (106, 934) and a valve actuator (104) for positioning a valve member (102) of a valve (101) for regulating (e.g. opening or closing a gate to allow) flow of molding material in the molding system (900), wherein the controller (106, 934) is configured to monitor an operating parameter of the valve actuator (104) for indirectly appreciating an indication of a molding parameter of the molding system (900).

According to another aspect disclosed herein (and not limited thereto), there is provided a method executable in a controller (106, 934) of a molding system (900) for controlling the operation thereof. The method includes executing a control sequence to control a valve actuator (104) that selectively positions a valve member (102) of a valve for regulating flow of molding material in the molding system (900), monitoring an operating parameter of the valve actuator (104), and indirectly appreciating an indication of a molding parameter of the molding system (900) on the basis of the operating parameter of the valve actuator (104).

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a control structure for a molding system and a related method that is executable in a controller of the molding system for controlling the operation thereof. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Introduction

As those of skill in the art will appreciate, a variety of types of molding systems exist, such as, for example, injection or compression molding systems, that are configured to perform the steps of preparing (e.g. melting), in a melt preparation device, molding material, such as, for example, a thermoplastic such as Polyethylene terephthalate (PET), dispensing (e.g. injecting, extruding or otherwise directing) the molding material such that it enters one or more mold cavities, defined in a mold, to mold molded articles therein.

Control structures for these molding systems typically include one or more controllers, such as, for example, an industrial computer, programmable logic controller and the like, that is configured to control various controllable devices of the molding system.

One such controllable device may include a valve actuator, such as, for example, an electric actuator, a hydraulic actuator or a pneumatic actuator, for positioning a valve member of a valve for regulating flow of the molding material in the molding system. Furthermore, these systems often include multiple valve actuators for controlling multiple valves for regulating the flow of the molding material at various locations. These valves may be present anywhere along a flow path of the molding material that extends from the melt preparation device to the mold. A typical location for the valves is at the multiple outlets of a molding material distributor that distribute the molding material to the mold cavities.

It has been discovered that the control structure may be improved by configuring it to monitor an operating parameter of the valve actuator for indirectly appreciating an indication of the molding parameter of the molding system, such as, for example, a condition (e.g. pressure, temperature, viscosity) relating to the molding material. These operating parameters of the valve actuator may be appreciated by monitoring an intrinsic operating parameter thereof, such as, for example, an applied voltage or current, or otherwise appreciated by monitoring feedback from one or more sensor(s) that are associated therewith. For example, a position and/or temperature sensor that is integral to the valve actuator may be monitored to provide information on a position of a driving member of the valve actuator that is connected to the valve member and a temperature of the valve actuator during the operation thereof.

In particular, the controller is configured to correlate changes in the operating parameter(s) of the valve actuator to changing forces acting on the valve member with which to indirectly evaluate the molding parameter on the basis thereof. For example, the controller may be configured to execute steps wherein at least one of a change in pressure and temperature of the molding material is evaluated on the basis of correlating a change in position (i.e. position signal) of the driven member to changing forces acting on the valve member that is connected thereto. For instance, the controller may be configured to detect an end of filling of the mold cavity by analyzing current flow through the valve actuator in closed loop motion control. The foregoing evaluation may also take into account the operating parameter of the valve actuator as a function of time and calculating a derivative of one or more of a velocity, integrated position error of the valve member. As a further example, the controller may be configured to evaluate the indication of the molding parameter by performing steps of correlating a change in temperature of the valve actuator to heat generated as a result of an increase in actuation force/torque to undo the change in position and maintain position.

These indications of the molding parameter may be used for various purposes. For example, this information may be reported to an operator of the molding system (via an operator interface device of the molding system) for reference purposes or control decision making, logged in a database of the controller, or used as a control input. For example, the controller may be configured to control the controllable device(s) of the molding system on the basis of the indication of the molding parameter. In contrast, existing control strategies typically rely on feedback from one or more sensor(s) (e.g. pressure transducer, temperature probe) that provide a more or less direct indication of a molding parameter in the molding system. A technical effect of the foregoing is that useful information on the state of the molding system may be appreciated without otherwise integrating additional sensors.

Non-Limiting Embodiment(s)

A non-limiting embodiment of the foregoing may be appreciated from the following description wherein the control structure is configured to interpret feedback on an operating parameter of the valve actuator to provide a way of sensing/determining when the mold cavity is full in a non-intrusive way.

In this example, the valve is positioned between the molding material distributor (e.g. hot runner) and a mold cavity that is defined in a mold for regulating flow of the molding material thereto. More particularly, the valve member is a valve stem that is reciprocated, in use, by the valve actuator, wherein the valve stem cooperates with a gate at an inlet to the mold cavity to regulate the flow of the molding material thereto.

The following broad steps are performed:
1) The valve stem position and movement is controlled by the valve actuator, such as a linear motor with a drive that controls force on the stem through application of electric current (i.e. operating parameter);
2) The motor is energized to move the valve stem to an open position
3) The motor is energized to keep the valve stem in the open position by resisting the mold-filling pressure pushing the valve stem back;
4) Force required to keep valve stem in the open position slowly increases as the pressure required to continue mold filling increases thereby giving the control structure information on the pressure of the molding material in the mold cavity (i.e. molding parameter) which may then be evaluated to gauge the current status of the filling of the mold cavity;
5) When the mold cavity is full the pressure spikes and the force required to hold the valve-stem in position spikes as well thereby giving the control structure further information from which to evaluate that the mold cavity is full—which may be a signal to trigger further control steps affecting the present or subsequent molding cycles.

In an alternative non-limiting embodiment, also described hereafter, the foregoing method may be altered wherein the same information on the molding parameter may be evaluated by the control structure by controlling the valve actuator to provide a constant force on the valve member, monitoring movement thereof during the filling of the mold cavity, and evaluating the molding parameter having knowledge that that the pressure of the molding material is proportional to the pressure acting on it.

Specifically, FIGS. 1, 2A, 3A, 4A, 5A, 6A depict example schematic representations of a so-called mold-tool system 100. In these non-limiting embodiments the mold-tool system 100 includes a controller assembly 106 (i.e. controller), a valve-stem actuator 104 (i.e. valve actuator), and a valve-stem assembly 102 (i.e. valve member) of a valve 101. A runner system 916 (i.e. molding material distributor) and/or other such device of a molding system 900, such as, for example an extruder assembly 902 (i.e. melt preparation device) may include the mold-tool system 100. The molding system 900 and the runner system 916 may include (and are not limited to) components that are known to persons skilled in the art, and these known components will not be described here; these known components are described, at least in part, in the following reference books (for example): (i) "Injection Molding Handbook" authored by OSSWALD/TURNG/GRAMANN (ISBN: 3-446-21669-2), (ii) "Injection Molding Handbook" authored by ROSATO AND ROSATO (ISBN: 0-412-99381-3), (iii) "Injection Molding Systems" 3rd Edition authored by JOHANNABER (ISBN 3-446-17733-7) and/or (iv) "Runner and Gating Design Handbook" authored by BEAUMONT (ISBN 1-446-22672-9).

Figure 1:
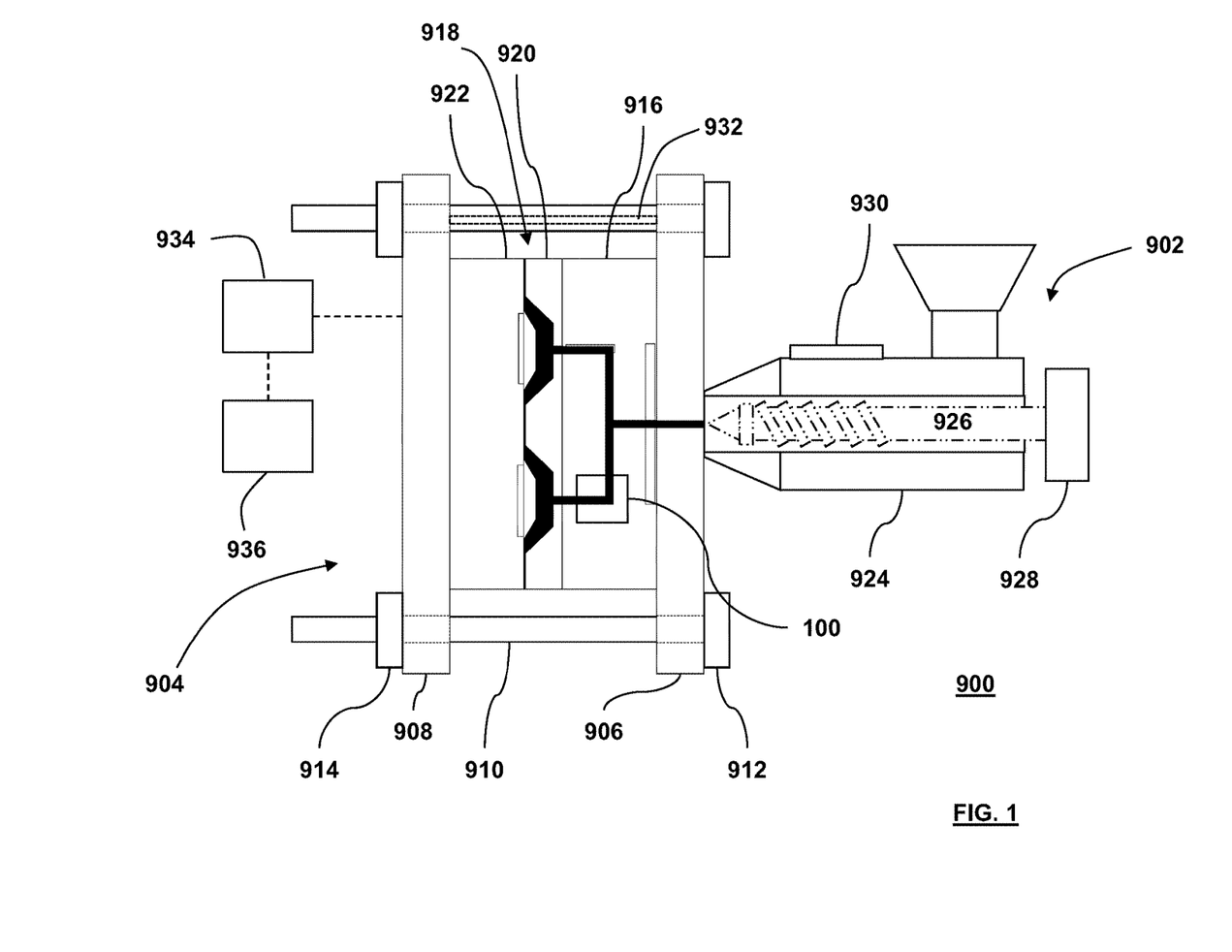
FIGS. 1, 2A, 3A, 4A, 5A, 6A and 8 depict examples of schematic representations of a mold-tool system (100)

Referring now to FIG. 1, there is depicted the schematic representation of the molding system 900, wherein the mold-tool system 100 is associated with the runner system 916. The molding system 900 may also be called an injection-molding system for example. According to the example depicted in FIG. 1, the molding system 900 includes (and is not limited to): (i) the extruder assembly 902, (ii) a clamp assembly 904 (i.e. mold clamping device), (iii) the runner system 916, (iv) a mold assembly 918 (i.e. mold), (v) a system controller 934 and an associated operator interface device. By way of example, the extruder assembly 902 is configured, to prepare, in use, a heated, flowable resin (i.e. molding material), and is also configured to inject or to move the resin from the extruder assembly 902 toward the runner system 916. Other names for the extruder assembly 902 may include injection unit, melt-preparation assembly, etc. By way of example, the clamp assembly 904 includes (and is not limited to): (i) a stationary platen 906, (ii) a movable platen 908, (iii) a rod assembly 910, (iv) a clamping assembly 912, and/or (v) a lock assembly 914. The stationary platen 906 does not move; that is, the stationary platen 906 may be fixedly positioned relative to the ground or floor. The movable platen 908 is configured to be movable relative to the stationary platen 906. A platen-moving mechanism (i.e. mold-stroke actuator, not depicted) is connected to the movable platen 908, and the platen-moving mechanism is configured to move, in use, the movable platen 908. The rod assembly 910 extends between the movable platen 908 and the stationary platen 906. The rod assembly 910 may have, by way of example, four rod structures positioned at the corners of the respective stationary platen 906 and the movable platen 908. The rod assembly 910 is configured to guide movement of the movable platen 908 relative to the stationary platen 906. A clamping assembly 912 (i.e. clamp actuator) is connected to the rod assembly 910. The stationary platen 906 supports the position of the clamping assembly 912. The lock assembly 914 is connected to the rod assembly 910, or may alternatively be connected to the movable platen 908. The lock assembly 914 is configured to selectively lock and unlock the rod assembly 910 relative to the movable platen 908. By way of example, the runner system 916 is attached to, or is supported by, the stationary platen 906. The runner system 916 includes (and is not limited to) the mold-tool system 100. The runner system 916 is configured to receive the resin from the extruder assembly 902. By way of example, the mold assembly 918 includes (and is not limited to): (i) a mold-cavity assembly 920, and (ii) a mold-core assembly 922 that is movable relative to the mold-cavity assembly 920. The mold-core assembly 922 is attached to or supported by the movable platen 908. The mold-cavity assembly 920 is attached to or supported by the runner system 916, so that the mold-core assembly 922 faces the mold-cavity assembly 920. The runner system 916 is configured to distribute the resin from the extruder assembly 902 to the mold assembly 918.

Still referring to FIG. 1, in operation, the movable platen 908 is moved toward the stationary platen 906 so that the mold-cavity assembly 920 is closed against the mold-core assembly 922, so that the mold assembly 918 may define a mold cavity configured to receive the resin from the runner system 916. The lock assembly 914 is engaged so as to lock the position of the movable platen 908 so that the movable platen 908 no longer moves relative to the stationary platen 906. The clamping assembly 912 is then engaged to apply a clamping pressure, in use, to the rod assembly 910, so that the clamping pressure then may be transferred to the mold assembly 918. The extruder assembly 902 pushes or injects, in use, the resin to the runner system 916 which in turn distributes the resin to the mold cavity structure (i.e. mold cavity) defined by the mold assembly 918. Once the resin in the mold assembly 918 is solidified, the clamping assembly 912 is deactivated so as to remove the clamping force from the mold assembly 918, and then the lock assembly 914 is deactivated to permit movement of the movable platen 908 away from the stationary platen 906, and then a molded article may be removed from the mold assembly 918.

Figures 2A, 2B:
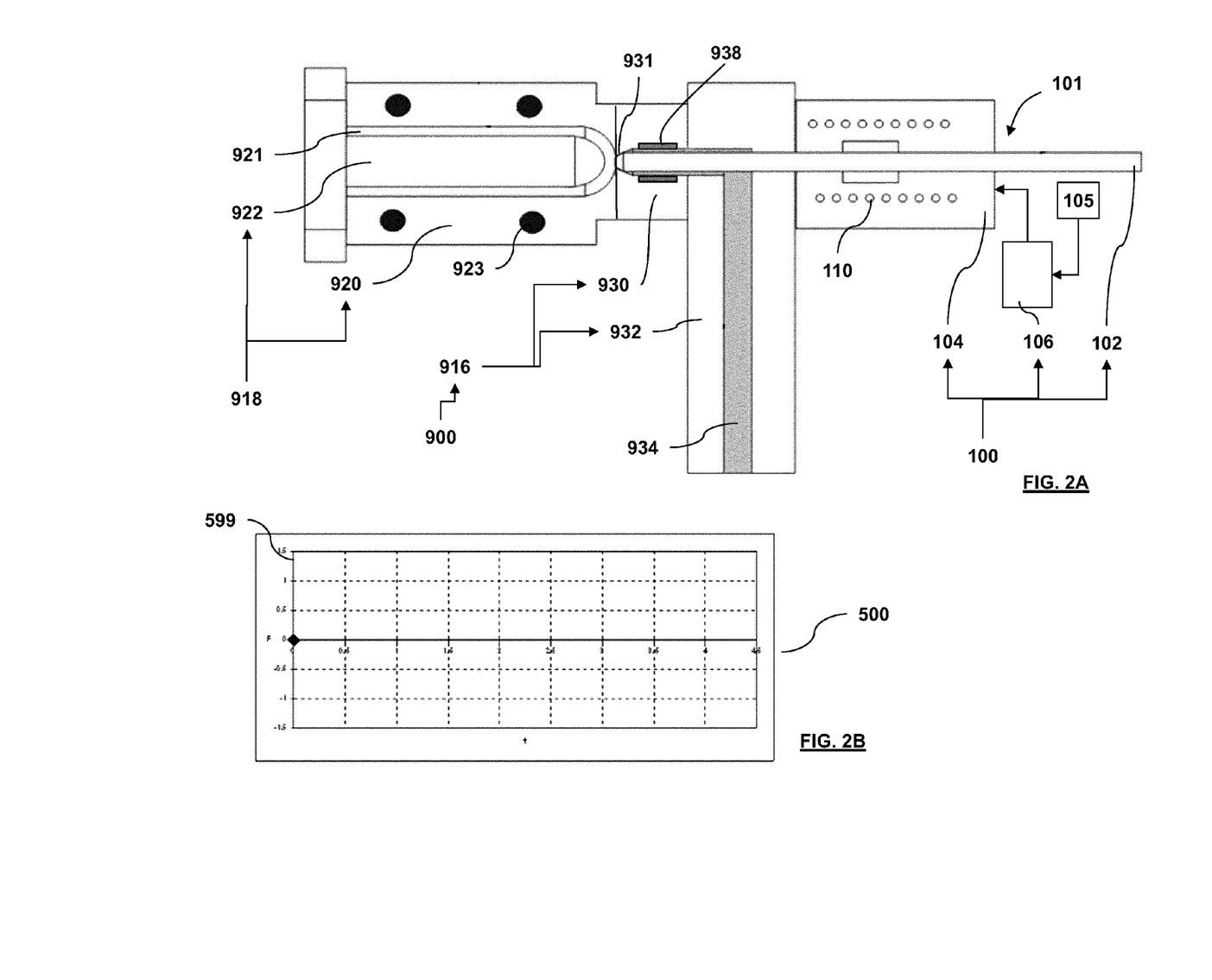
FIGS. 2B, 3B, 4B, 5B, 6B and 7 depict example of a force-versus-time graph (500) associated with operation of the mold-tool system (100).

Referring now to FIG. 2A, the mold-tool system 100 is shown to include (and is not limited to): a combination of: the valve-stem assembly 102, the valve-stem actuator 104, an encoder assembly 105 (i.e. sensor), and the controller assembly 106 (which may separate or integrated with the system controller 934 mentioned previously). The controller assembly 106 may include a digital-based controller, or an analogue-based controller or a combination of both. The digital controller may or may not include a digital processing unit. Persons of skill in the art have the knowledge required to design and build such control systems based on a structural and/or functional specification. According to the example depicted in FIG. 2A, the valve-stem actuator 104 is not (at this time) energized or actuated. The valve-stem assembly 102 is for the runner system 916 of the molding system 900. The valve-stem actuator 104 is connected to the valve-stem assembly 102. The controller assembly 106 is connected to the valve-stem actuator 104. The controller assembly 106 is configured to sense process (i.e. molding parameter) of the molding system 900 responsive to forcible movements imposed to the valve-stem assembly 102 by forces acting on the valve-stem assembly 102. By way of example, a way (from amongst other ways) in which the controller assembly 106 may be configured to sense process of the molding system 900 responsive to forcible movements imposed to the valve-stem assembly 102 is by way of the encoder assembly 105. The encoder assembly 105 is positioned proximate to a portion of the valve-stem assembly 102. Alternatively, the encoder assembly may be associated with the valve-stem actuator 104 for monitoring a position of a driving member (not shown) that is connected to the valve-stem assembly 102. In a further alternative, the controller feedback with which the controller may derive the position of the valve-stem assembly 102 may be derived from monitoring some other operational parameter thereof, such as, for example, an intrinsic operating parameter thereof. Returning to the description of the present non-limiting embodiment, it may be further appreciated that the encoder assembly 105 is coupled to the controller assembly 106. The encoder assembly 105 is configured to sense position of the valve-stem assembly 102, and is also configured to provide an indication, to the controller assembly 106, of a sensed position of the valve-stem assembly 102. The controller assembly 106 is configured to provide a control signal to the valve-stem actuator 104 so that the valve-stem actuator 104 responds in a manner that maintains, in use, the position of the valve-stem assembly 102 at a relatively stationary position (that is, within an acceptable tolerance) while the valve-stem assembly 102 is subjected to applied forces, which is to be described further below. Generally speaking, position of the valve-stem assembly 102 and movement of the valve-stem assembly 102 are controlled by the valve-stem actuator 104. The valve-stem actuator 104 includes (by way of example) a linear motor with a drive that controls force on the valve-stem assembly 102 by way of application of electric current. A mold cavity 921 is defined between the mold-core assembly 922 and the mold-cavity assembly 920. A cooling assembly 923 is included in the mold-cavity assembly 920, and is configured to cool the mold-cavity assembly 920 as required, and as known. The runner system 916 includes (and is not limited to): a nozzle assembly 930, and a melt-distribution assembly 932. The nozzle assembly 930 is connected to the mold-cavity assembly 920. The melt-distribution assembly 932, also known as a runner manifold, is connected to the nozzle assembly 930. The nozzle assembly 930 and the melt-distribution assembly 932 define a melt channel 934 that is used to transport or convey or distribute the resin or melt from the extruder assembly 902 (FIG. 1) to the mold assembly 918.

With reference to FIG. 2A, the controller assembly 106 includes, by way of example, a processor assembly (central processing unit, etc; not shown) coupled to a memory unit (not shown). The memory unit tangibly embodies processor-executable code or instructions. The processor assembly may execute the processor-executable code, and thus the processor assembly performs functions that control the valve-stem actuator 104 as described further below. The processor-executable code may be fabricated by compiling high-level programmed instructions in accordance with methods and systems as known in the art. The processor assembly may be coupled to the valve-stem actuator 104 by way of interfacing circuits. An example of the processor assembly is the Intel® Core® processor, which is manufactured by Intel Corporation (2200 Mission College Blvd. Santa Clara, Calif. USA). The processor assembly is the portion of a computer system that carries out the instructions of a computer program, to perform functions (arithmetical, logical, and input/output operations) of the computer system. Two components of the processor assembly are the arithmetic logic unit (ALU; not shown), which performs arithmetic and logical operations, and the control unit (CU; not shown), which extracts instructions from memory and decodes and executes them, calling on the ALU when necessary. The processor assembly may include, for example, an array processor or vector processor, as known to those of skill in the art, that has multiple parallel computing elements. In the distributed computing model, problems may be solved by a distributed interconnected set of processors. In computing, an executable file causes the processor assembly to perform indicated tasks according to encoded instructions, as opposed to a data file that must be parsed by a program to be meaningful. These instructions are traditionally machine-code instructions for the processor assembly. However, in a more general sense, a file containing instructions (such as bytecode) for a software interpreter may also be considered executable; even a scripting language source file may therefore be considered executable in this sense.

Referring now to FIG. 2B, there is depicted a force-versus-time graph 500 associated with operation of the mold-tool system 100; that is, specifically for the operation of the valve-stem actuator 104. As depicted in FIG. 2B, the valve-stem actuator 104 is in a state in which no forces are applied to the valve-stem assembly 102 for the time leading up to (before) time 599. The encoder assembly 105 senses that the valve-stem assembly 102 is not being moved and provides this indication to the controller assembly 106. Alternatively, the controller assembly 106 may appreciate this same information from monitoring some other operating parameter of the valve-stem actuator 104. The controller assembly 106 then responds by not imparting or applying a movement force to the valve-stem assembly 102, and thus the valve-stem assembly 102 remains in a stationary position as indicated in FIG. 2B, in which the tip of the valve-stem assembly 102 remains in the mold gate 931 so that no melt or resin flows from the runner system 916 to the mold assembly 918. The horizontal axis (that is, the time axis) of the force-versus-time graph 500 represents the passage of time. The vertical axis (that is, the force axis) of the force-versus-time graph 500 represents the magnitude of the force applied to the valve-stem assembly 102 from the valve-stem actuator 104. In a direction upwardly along the vertical axis represents the magnitude of the force applied to the valve-stem assembly 102 from the valve-stem actuator 104 along a direction that is toward the mold gate 931, so that the valve-stem assembly 102 may then close the mold gate 931 and thus prevent flow of melt from the runner system 916 to the mold assembly 918. In a direction downwardly along the vertical axis represents the magnitude of the force applied to the valve-stem assembly 102 from the valve-stem actuator 104 along a direction that is away from the mold gate 931, so that the valve-stem assembly 102 may then open the mold gate 931 and thus allow the flow of melt from the runner system 916 to the mold assembly 918.

Figure 3A:
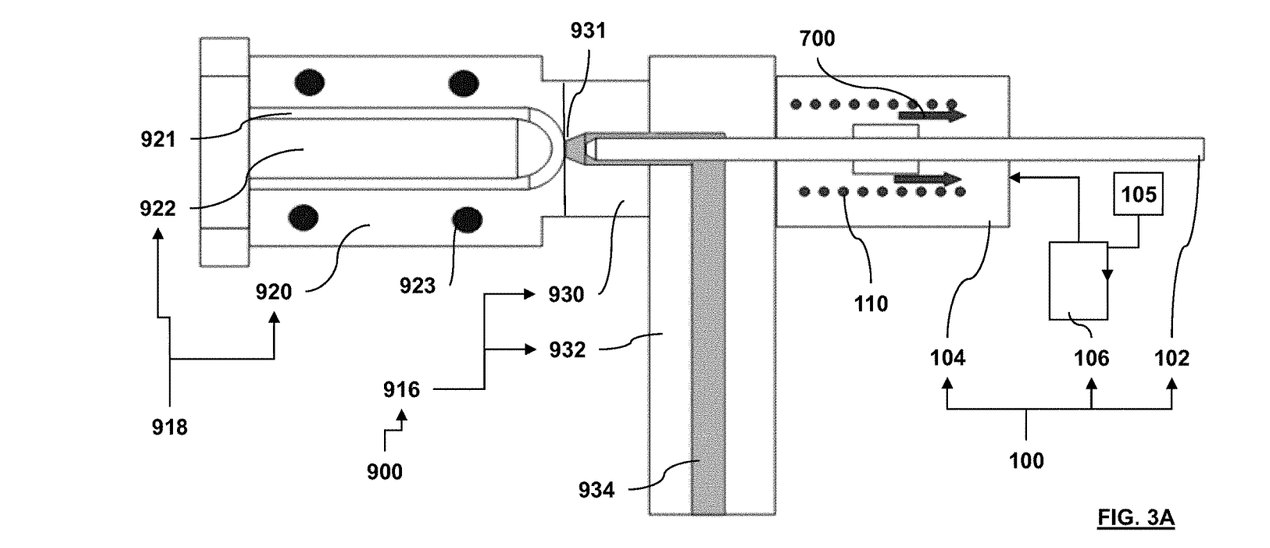

Referring now to FIG. 3A, the valve-stem actuator 104 is energized to move the valve-stem assembly 102 to an open position; that is, the mold gate 931 is open to allow for flow of molding material therethrough. This correlates to a point in a molding process that the molding material begins to fill the mold cavity 921. The controller assembly 106 sends a control signal to the valve-stem actuator 104 and the valve-stem actuator 104 moves the valve-stem assembly 102 to the open position, as depicted in FIG. 3A. Once the valve-stem assembly 102 has been moved to the open position, then the controller assembly 106 controls the valve-stem actuator 104 so that the valve-stem assembly 102 is maintained in a selected (e.g. stationary) condition in the open position as depicted in FIG. 2, within an acceptable amount of tolerance. After the valve-stem assembly 102 has reached the open position, then the controller assembly 106 uses the output of the encoder assembly 105, or information from monitoring another operating parameter of the valve-stem actuator 104, to evaluate and henceforth apply an adjustment force to the valve-stem assembly 102. The adjustment force that is applied to the valve-stem assembly 102 is enough to keep the valve-stem assembly 102 in the selected (e.g. stationary) position in the open position or condition, within an acceptable level of tolerance. For example, a coil assembly 110 of the valve-stem actuator 104 is energized to force the valve-stem assembly 102 back; specifically, the valve-stem assembly 102 is moved away from the mold gate 931 so as to permit the flow of the resin from the runner system 916 or the nozzle assembly 930 to the mold assembly 918. In effect, the controller assembly 106 is configured to appreciate the operating parameter of pressure of the molding material by virtue of the operating parameter of the valve-stem actuator 104.

Figure 3B:
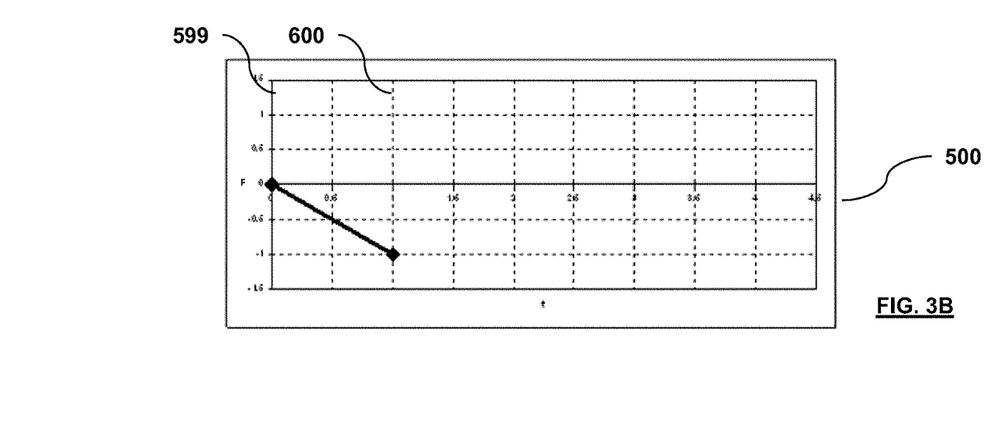

Referring now to FIG. 3B, the force-versus-time graph 500 indicates that the valve-stem actuator 104 is actuated so as to apply, from time 599 to time 600, an initial actuator force 700 to the valve-stem assembly 102, and the valve-stem assembly 102 then moves away from the mold gate 931 so as to allow flow of the resin from the runner system 916 to the mold assembly 918. At time 600, the valve-stem actuator 104 then applies just enough force to the valve-stem assembly 102 to maintain the position of the valve-stem assembly 102 in the selected (e.g. stationary) position, as indicated in FIG. 3A. At time 600 and after time 600, the controller assembly 106 uses the output of the encoder assembly 105 to determine if there is a net force applied to the valve-stem assembly 102 which causes the valve-stem assembly 102 to move away from the selected position. If the controller assembly 106 receives a signal from the encoder assembly 105 that the valve-stem assembly 102 begins to move, then the controller assembly 106 sends an adjustment control signal to the valve-stem actuator 104, and the valve-stem actuator 104 then moves the valve-stem assembly 102 back to the selected position. The controller assembly 106 may use a control loop program for dynamic control of the position of the valve-stem assembly 102 in the selected position (as depicted in FIG. 3A).

Figures 4A, 4B:
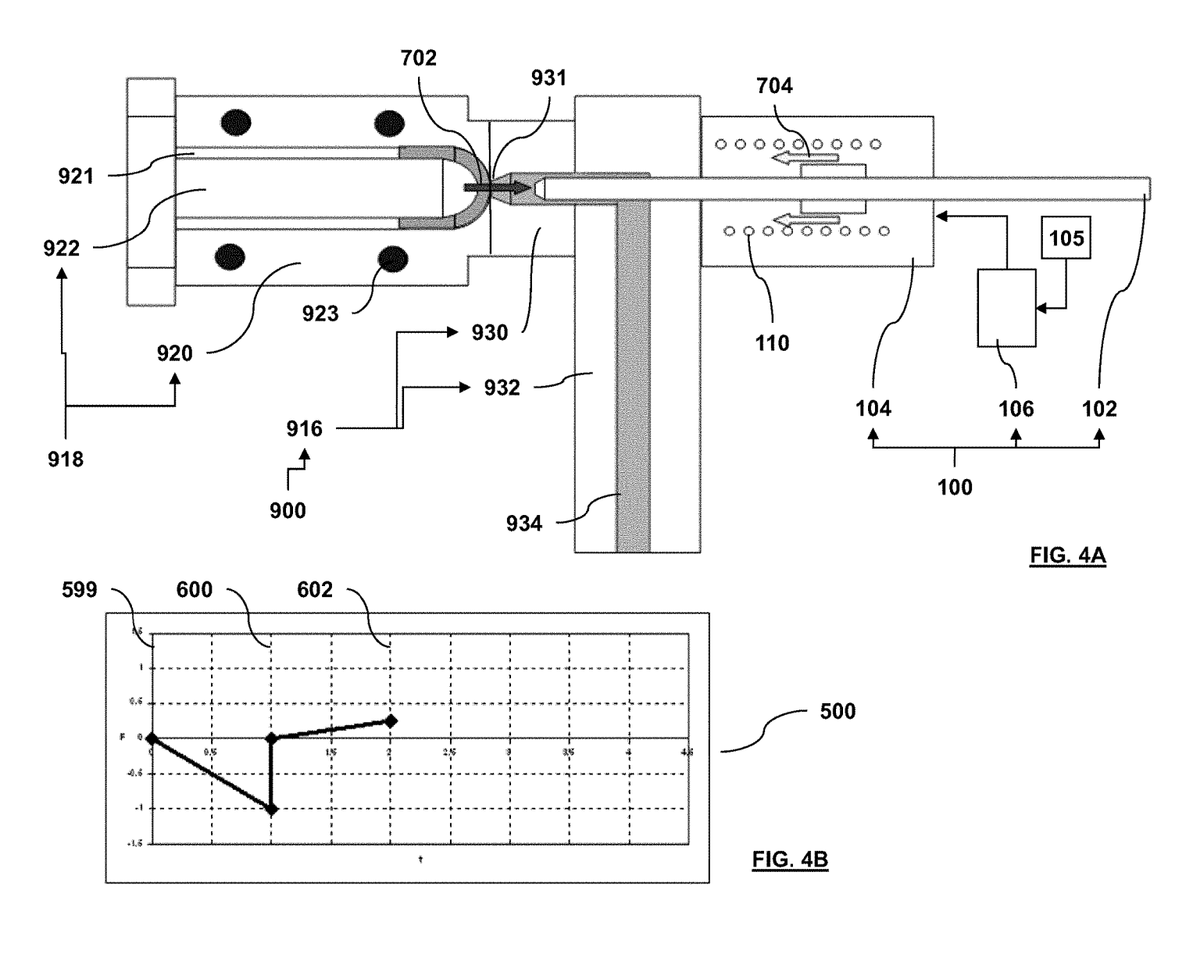

Referring now to FIG. 4A, the valve-stem actuator 104 continues to remain energized, under control of the controller assembly 106, to keep the valve-stem assembly 102 in the open position (the stationary position) by resisting a mold-filling force or pressure that pushes the valve-stem assembly 102 back and further away from the mold gate 931. This correlates to a point in the molding process that the molding material continues to fill the mold cavity 921. The coil assembly 110 of the valve-stem actuator 104 is energized, under control of the controller assembly 106 to hold or maintain position of the valve-stem assembly 102 and thus prevent the valve-stem assembly 102 from moving further back and away from the mold gate 931 due to force or pressure applied to the valve-stem assembly 102 as a result of resin entering the mold assembly 918. In the open position, the mold gate 931 remains open for flow of the resin from runner system 916 to the mold assembly 918.

Referring now to FIG. 4B, the valve-stem actuator 104 continues to apply an actuation force to the valve-stem assembly 102 until time 600 that moves the valve-stem assembly 102 to the open position. At time 600, the resin that enters the mold cavity 921 begins to apply a mold-filling force 702 to the valve-stem assembly 102 that urges or moves the valve-stem assembly 102 even further away from the mold gate 931. However, the encoder assembly 105 senses that the valve-stem assembly 102 is beginning to move further away from the selected (e.g. stationary) position, and thus the controller assembly 106 receives the signal form the encoder assembly 105. Then the controller assembly 106 sends an adjustment signal to the valve-stem actuator 104 so that the valve-stem actuator 104 then applies a counter-acting force 704 to the valve-stem assembly 102 that counter acts the mold-filling force 702 applied by the melt from the mold cavity 921 to the valve-stem assembly 102, so that (in effect) the net force acting on the valve-stem assembly 102 is zero (within an acceptable tolerance level— that is the valve-stem assembly 102 may move back and forth within a level of tolerance), and thus the valve-stem assembly 102, in effect, remains stationary (substantially within an acceptable tolerance level) from time 600 to time 602.

Figure 5A:
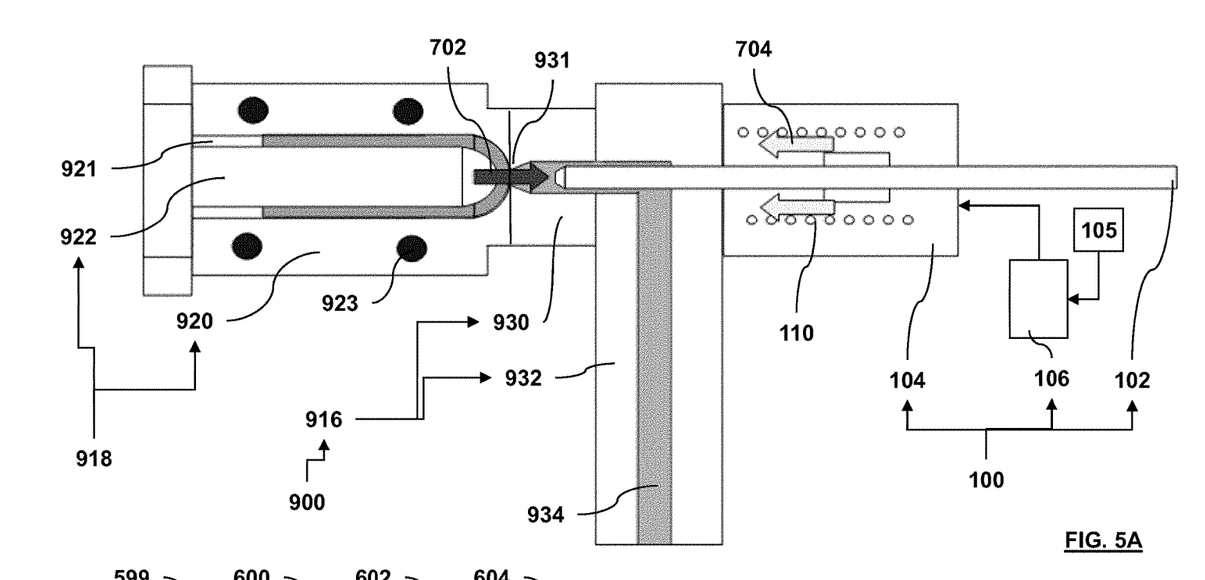

Referring now to FIG. 5A, the force applied by the valve-stem actuator 104 to the valve-stem assembly 102 required to keep the valve-stem assembly 102 in the stationary position (the open position) increases as the resin pressure increases in the mold assembly 918 on account of more resin entering the mold assembly 918. This correlates to a point in a molding process that the molding material is close to filling the mold cavity 921. The coil assembly 110 of the valve-stem actuator 104 is further energized to hold the valve-stem assembly 102 from moving back due to further increasing pressure from mold filling, and thus keep the valve-stem assembly 102 in or at the selected (e.g. stationary) position, as indicated in FIG. 5A.

Figure 5B:
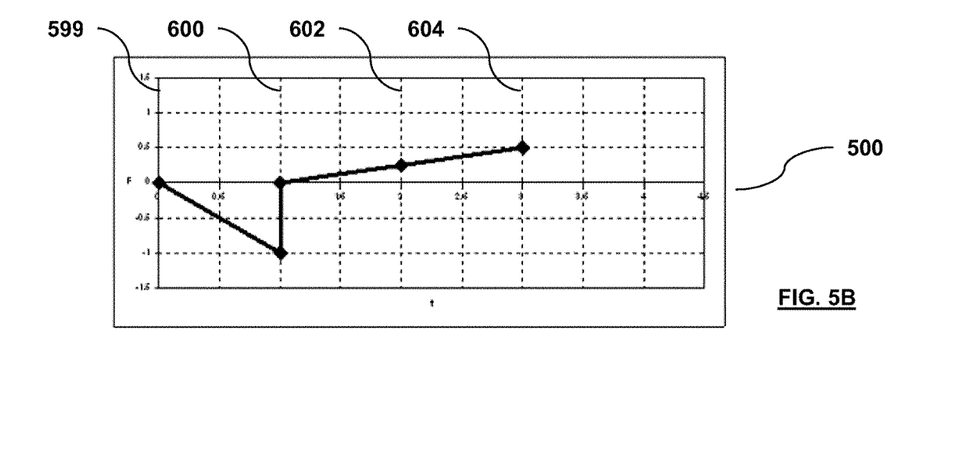

Referring now to FIG. 5B, from time 602 to time 604, the resin located in the mold cavity 921 continues to apply an ever increasing amount of the mold-filling force 702 to the valve-stem assembly 102, while the valve-stem actuator 104 also continues to apply an ever increasing amount of the counter-acting force 704 to the valve-stem assembly 102, so that the net force acting on the valve-stem assembly 102 is zero, and thus the valve-stem assembly 102 remains substantially stationary from time 602 to time 604. The encoder assembly 105 continues to provide a signal to the controller assembly 106, and the controller assembly 106 uses the signal from the 105 to provide an appropriate amount of control signal to the valve-stem actuator 104, and the valve-stem actuator 104 applies just the right amount of counter force to the valve-stem assembly 102 that keeps the valve-stem assembly 102 in the selected position (within an acceptable level of tolerance).

Figure 6A:
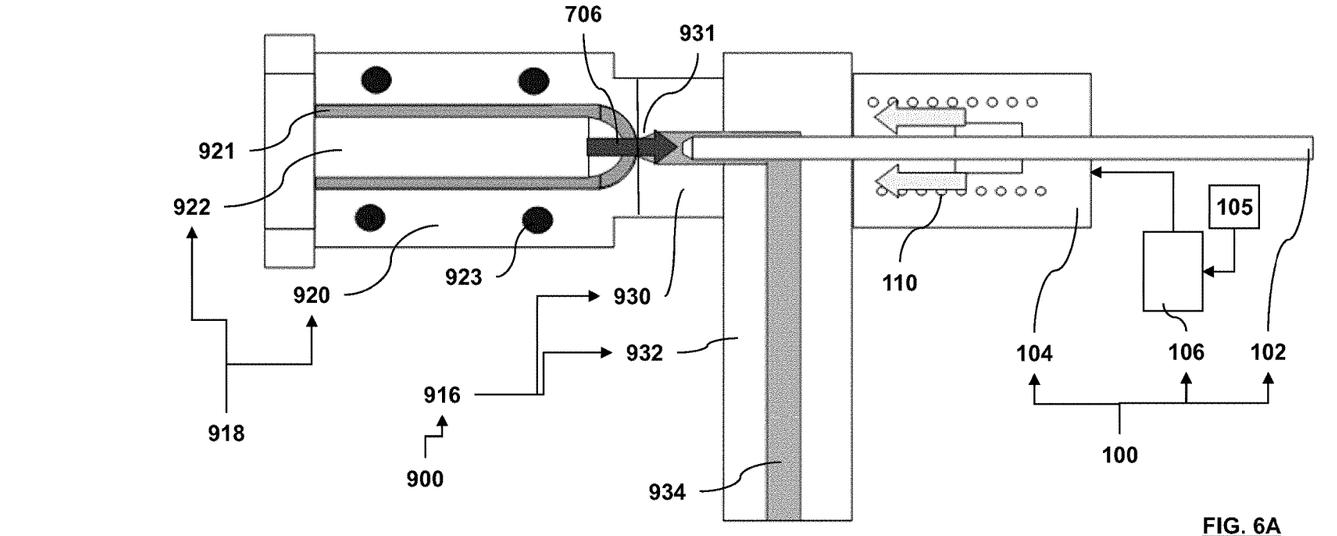

Referring now to FIG. 6A, once the mold assembly 918 is filled with resin, the pressure or force of the resin, in the mold assembly 918, spikes (over a very short period of time), and the counter force that is required to hold the valve-stem assembly 102 in position has to spike as well. This correlates to a point in a molding process that the molding material has filled the mold cavity 921 and a packing thereof is commenced. That is, a spike in the counter force is required to keep the valve-stem assembly 102 from moving due to abrupt pressure change associated with completion of filling of the mold-cavity assembly 920. However, the controller assembly 106 may not be able respond quickly enough so as to maintain or keep the valve-stem assembly 102 in the selected position. However, once the spike in the resin force has subsided or is removed, then the controller assembly 106 can then provide the correct amount of counter force, via the valve-stem actuator 104, to the valve-stem assembly 102 that keeps the valve-stem assembly 102 in the selected position.

Figure 6B:
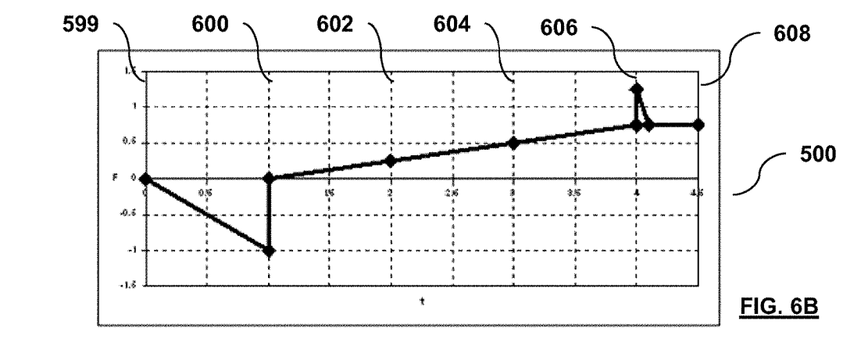

Referring now to FIG. 6B, from time 604 to time 606, the resin located in the mold cavity 921 continues to apply an ever increasing amount of the mold-filling force 702 applied to the valve-stem assembly 102, while the valve-stem actuator 104 also applies an ever increasing amount of the counter-acting force 704 applied to the valve-stem assembly 102, so that the net force acting on the valve-stem assembly 102 is zero (within acceptable tolerance limits), and thus the valve-stem assembly 102 remains substantially in the stationary position from time 604 to time 606. At time 606, the mold cavity 921 of the mold assembly 918 becomes filled with the resin, and thus a spike force 706 is imparted to the valve-stem assembly 102 for a short (brief) amount of time, which pushes the valve-stem assembly 102 (temporality) for a brief period of time even further away from the mold gate 931. From time 606 to time 608, after the spike force 706 no longer exists, the valve-stem actuator 104 continues to apply the counter force to the valve-stem actuator 104, and the counter force is enough to maintain the valve-stem assembly 102 at the selected position. Other cycles of the molding system 900 include a cycle for eventually closing the mold gate 931 so that the resin in the runner system 916 is no longer in fluid communication with the mold cavity 921. For the case where the mold gate 931 is closed (this case is not depicted) and the valve-stem actuator 104 is de-actuated or de-energized so that no net force acts on the valve-stem assembly 102, and the resin in the mold cavity 921 may solidify with help from the cooling assembly 923. Once solidified, the molded article in the mold cavity 921 may be removed thus completing a molding cycle of the molding system 900.

Generally speaking, without reference to any figure, another option or example is to actuate the valve-stem actuator 104 so as to maintain application of a constant force to the valve-stem assembly 102, and have the controller assembly 106 monitor movement of the valve-stem assembly 102. The movement of the valve-stem assembly 102 may be proportional to the pressure acting on the valve-stem assembly 102. The signal generated in this manner may be used as a control input. For example, in a multi-cavity mold assembly (known and not depicted), the mold cavities that are found to fill first may have the temperatures of the melt channels leading to them reduced, choking off the flow of resin so that all mold cavities may fill simultaneously. Or valve-stem assembly 102 may close first on mold cavities that were filled first.

Figure 7:
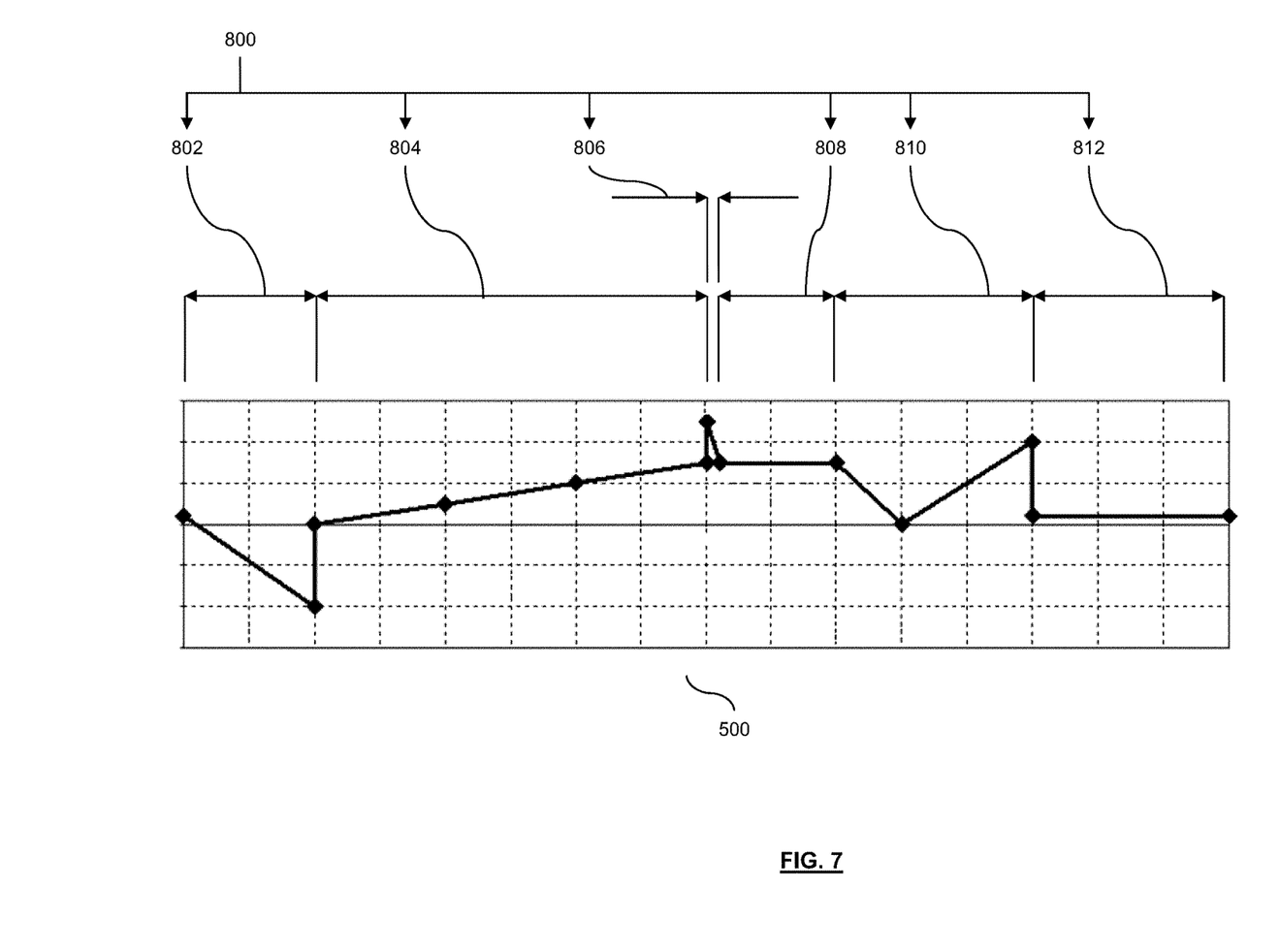

FIG. 7 depicts the force-versus-time graph 500 in which shows a molding cycle 800 of the molding system 900 of FIG. 1. The molding cycle 800 includes an open cycle 802, an injection cycle 804, a mold-full cycle 806, a hold cycle 808, a closing cycle 810, and a cooling cycle 812. During the open cycle 802, the status of the mold gate 931 goes from closed to open so that the resin may begin flowing into the mold assembly 918. During the injection cycle 804, the resin flows into the mold assembly 918. During the mold-full cycle 806, the mold assembly 918 becomes filled with the resin. During the hold cycle 808, pressure is placed or imposed to the resin held in the mold assembly 918 so that the resin in the mold assembly 918 may cool under pressure. During the closing cycle 810, the status of the mold gate 931 changes from open to closed. During the cooling cycle 810, the resin the mold assembly 918 cools so that the resin may solidify, then eventually may be removed once the mold assembly 918 is opened, as described with reference to FIG. 1.

In a further non-limiting embodiment that will be described next, the mold is a multi-cavity mold that defines a plurality of mold cavities and wherein a molding material distributor (e.g. hot runner) is associated therewith for distributing the molding material thereto. The molding material distributor includes a plurality of valves that are positioned at a plurality of outlets of melt channels that are defined therein, wherein the valves are configured to control molding material flow to the plurality of mold cavities. The controller is configured to monitor one or more operating parameters of a plurality of valve actuators that are associated with the plurality of valves with which to indirectly appreciate a plurality of indications of molding parameter(s) within the plurality of mold cavities. The controller may be further configured to control one or more controllable devices in the molding system on the basis thereof. For example, the controller may be configured to control a mass balance of a distribution of the molding material entering the mold cavities. More particularly, by monitoring the operating parameters of the various valve actuators the controller may evaluate the molding parameter(s) (e.g. plurality of melt pressure indications) to gauge which of the mold cavities were found to fill first. In subsequent control steps the controller may further use this information to re-balance the molding material distributor. The molding material distributor may be re-balanced, for example by adjusting one or more controllable devices. For example, one or more thermal devices 938 (e.g. heaters) that are associated with the molding material distributor (such as the nozzles thereof) may be adjusted such that the temperatures of selected melt channels leading to the earliest filled mold cavities may be reduced, choking off the flow so that all cavities would fill substantially fill simultaneously on a subsequent molding cycle—may require iterative adjustment. Put another way, the controller may be configured to detect a plurality of end-of-fill points in the plurality of melt pressure indications that correlate to points in a molding process wherein the plurality of mold cavities have been completely filled. On this basis the controller may be configured to control one or more controllable devices of the molding system in accordance with the plurality of end-of-fill points such that the plurality of mold cavities is filled substantially simultaneously.

Figure 8:
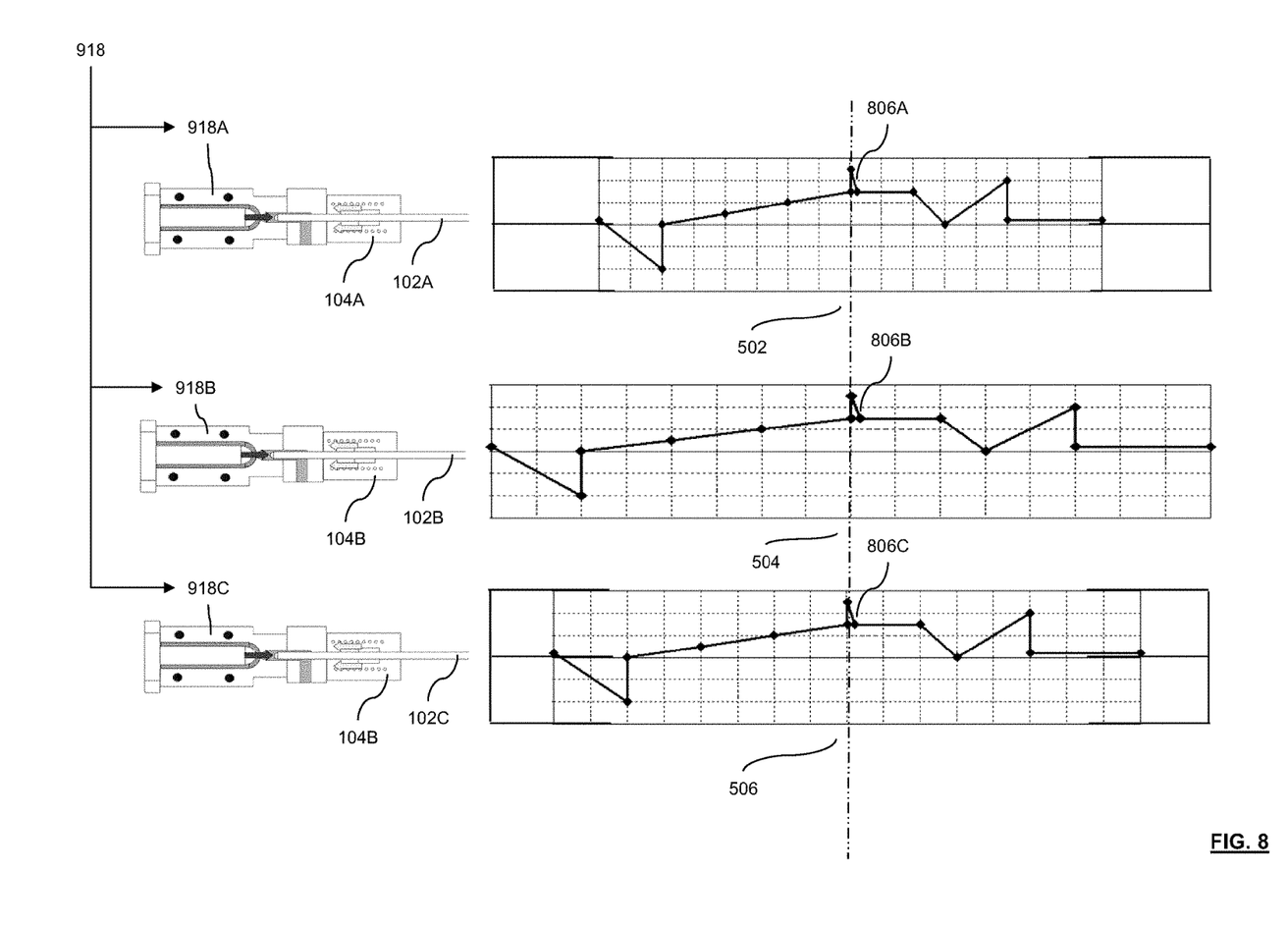

Specifically, FIG. 8 depicts a case where the mold assembly 918 of FIG. 1 includes (and is not limited to): a first mold assembly 918A, a second mold assembly 918B, and a third mold assembly 918C, each of which define an individual or unique mold cavity. It will be appreciated that the mold assembly 918 may include any number of mold cavities. Restated, the mold may be configured to define a plurality of mold cavities. A valve-stem assembly 102A is associated with the first mold assembly 918A (i.e. structure that defines a first mold cavity). A valve-stem assembly 102B is associated with the second mold assembly 918B (i.e. structure that defines a second mold cavity). A valve-stem assembly 102C is associated with the third mold assembly 918C (i.e. structure that defines a third mold cavity). A force-versus-time graph 502 depicts the force applied (over time) to the valve-stem assembly 102A, that is associated with the first mold assembly 918A, by a valve-stem actuator 104A, which is under the control of the controller assembly 106. A mold-full cycle 806A indicates the time when the first mold assembly 918A becomes filled with the resin. A force-versus-time graph 504 depicts the force applied to the valve-stem assembly 102B, that is associated with the second mold assembly 918B, by the valve-stem actuator 104B, which is under the control of the controller assembly 106. A mold-full cycle 806B indicates the time when the second mold assembly 918B becomes filled with the resin. A force-versus-time graph 506 depicts the force applied to the valve-stem assembly 102C, that is associated with the first mold assembly 918A, by the valve-stem actuator 104C, which is under the control of the controller assembly 106. A mold-full cycle 806C indicates the time when the third mold assembly 918C becomes filled with the resin. For the case depicted in FIG. 8, the controller assembly 106 is configured to control the valve-stem actuator 104A, 104B, 104C such that the mold-full cycle 806A of the first mold assembly 918A, the mold-full cycle 806B of the second mold assembly 918B, and the mold-full cycle 806C of the third mold assembly 918C occur at the same time, within an acceptable level of tolerance. The molding system 900 may need to be operated for several molding cycles in order for the controller assembly 106 to determine at what time the valve-stem assembly 102A, the valve-stem assembly 102B and the valve-stem assembly 102C are to be opened in a manner such that the mold-full cycle 806B of the second mold assembly 918B, and the mold-full cycle 806C of the third mold assembly 918C occur at the same time, within an acceptable level of tolerance.

According to an option, the controller assembly 106 is configured to control the valve-stem actuator 104A, 104B, 104C such that the first mold assembly 918A, the second mold assembly 918B, and third mold assembly 918C are closed together at a time during a mold filling process, within an acceptable level of tolerance. It will be appreciated that it is not necessarily required to have the controller assembly 106 control the valve-stem actuators 104A, 104B, 104C such that the mold-full cycle 806A, the mold-full cycle 806B, and the mold-full cycle 806C all occur at the same time, within an acceptable level of tolerance.

According to an option, the controller assembly 106 is configured to control a heater upstream of each mold assembly such that the first mold assembly 918A, the second mold assembly 918B, and third mold assembly 918C. The heater would be controlled to reduce the temperature, thereby throttling the flow to the earliest filling mold assembly in an iterative way such that the mold-full cycle 806A, the mold-full cycle 806B, and the mold-full cycle 806C all occur at the same time, within an acceptable level of tolerance.

In accordance with yet another non-limiting embodiment, the indication of the molding parameter (as gauged by the valve actuator) may relate to an indication of a viscosity of the molding material and the controllable device is a barrel heater 930 (FIG. 1), and wherein the controller 934 (FIG. 1) is configured to control the barrel heater 930 in order to maintain the molding material at a selected viscosity.

In accordance with yet another non-limiting embodiment, the controllable device is an injection actuator 928 (FIG. 1) that is operable to move an injector 926 (shown as a plasticizing screw in FIG. 1) that injects, in use, the molding material, and wherein the controller 934 is configured to control the injection actuator 928 on the basis of the indication of the molding parameter to perform one or more of (i) adjust transition position from fill to hold (i.e. when control of the melt preparation device switches from filling the molding cavity to packing it); (ii) adjust a fill speed; and (iii) adjust a hold pressure.

In accordance with a further embodiment the indication of the molding parameter is a pressure of the molding material which the controller 934 (FIG. 1) may employ to evaluate a clamping force required to resist a prevailing total pressure within the mold 918, wherein the system controller 934 is configured to control a clamp actuator 912 of the clamp assembly 904 to control the clamping force being applied to the mold 918 on the basis thereof.

In yet another non-limiting embodiment, the indication of the molding parameter may relate to an indication of a first-to-fill cavity of the mold, wherein the controller is configured to control the clamp actuator 934 to control a clamping force being applied to the mold on the basis thereof. Alternatively, the controller 934 may be configured to operate a mold-stroke actuator 932 to finish closing the mold 918 on the basis thereof.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A control structure for a molding system, comprising:
a controller; and
a valve actuator for positioning a valve member of a valve for regulating flow of molding material in the molding system;
wherein the controller is configured to control the valve actuator to maintain at least one of the valve actuator and the valve member in a selected condition and, while maintaining the at least one of the valve actuator and the valve member in the selected condition, monitor an operating parameter of the valve actuator for indirectly appreciating an indication of a molding parameter of the molding system and
wherein indirectly appreciating the indication of the molding parameter comprises correlating changes in the operating parameter of the valve actuator to changing forces acting on the valve member
wherein the operating parameter of the valve actuator to be monitored by the controller with which to indirectly appreciate the indication of the molding parameter includes a position of a driving member, and
wherein the controller is further configured to execute steps wherein a change in temperature of the molding material is evaluated on the basis of correlating a change in position of the driving member to changing forces acting on the valve member that is connected to the driving member and
wherein the controller is further configured to evaluate the indication of the molding parameter by performing steps of correlating a change in temperature of the valve actuator to heat generated as a result of an increase in actuation force/torque to undo the change in position and maintain position.

2. The control structure of claim 1, wherein:
the controller is configured to control a controllable device that is associated with a molding material distributor of the molding system on the basis of the indication of the molding parameter.

3. The control structure of claim 1, wherein:
the controller is further configured to adjust one or more of an open position of the valve member to choke melt flow and a timing of an open position of the valve member on the basis of the indication of the molding parameter.

4. The control structure of claim 1, wherein:
the operating parameter of the valve actuator is provided by a sensor that is associated with the valve actuator.

5. The control structure of claim 1, wherein:
the operating parameter of the valve actuator is provided by monitoring an intrinsic operating parameter of the valve actuator.

6. The control structure of claim 1, wherein:
the valve actuator is one of an electric actuator, a hydraulic actuator or a pneumatic actuator.

7. The control structure of claim 1, wherein:
the controller is further configured to evaluate the indication of the molding parameter by performing steps of calculating a derivative of one or more of a velocity, integrated position error of the valve member.

8. The control structure of claim 1, wherein:
the valve actuator is an electric actuator and wherein the operating parameter of the valve actuator to be monitored by the controller with which to indirectly appreciate the indication of the molding parameter includes one or more of:
an applied current;
an applied voltage; and
a position signal.

9. The control structure of claim 1, wherein:
the controller is configured to indirectly appreciate the indication of the molding parameter on the basis of the operating parameter of the valve actuator as a function of time, and the controller is configured to indirectly appreciate the indication of the molding parameter on the basis of a derivative of the operating parameter of the valve actuator.

10. The control structure of claim 1, wherein:
the valve is associated with a molding material distributor; the valve is positioned between the molding material distributor and a mold cavity that is defined in a mold for regulating flow of the molding material and;
the controller is configured to detect an end of filling of the mold cavity by analyzing current flow through the valve actuator in closed loop motion control.

11. The control structure of claim 10, wherein:
the valve member is a valve stem that is reciprocated, in use, by the valve actuator, wherein the valve stem cooperates with a gate to regulate the flow of the molding material.

12. The control structure of claim 10, wherein:
the valve is positioned within a melt channel that is defined in the molding material distributor for controlling a mass balance of a distribution of the molding material between a plurality of outlets.

13. The control structure of claim 1, further comprising:
a plurality of valve actuators for positioning a plurality of valve members of a plurality of valves that are associated with a molding material distributor of the molding system to control molding material flow to a plurality of mold cavities that are defined in a mold of the molding system;
wherein, the controller is configured to monitor one or more operating parameters of the plurality of valve actuators with which to indirectly appreciate a plurality of indications of molding parameters within the plurality of mold cavities.

14. The control structure of claim 1 wherein the controller is configured to maintain the valve member in a selected position within an acceptable tolerance.

15. The control structure of claim 14 wherein the monitored operating parameter is a movement of the valve member and wherein the indication of the molding parameter is an indication of pressure acting on the valve member.

16. The control structure of claim 1 wherein the controller is configured to maintain the valve actuator in a condition of applying a selected force, within an acceptable tolerance, to the valve member.

17. The control structure of claim 16 wherein the monitored operating parameter is an output of an encoder assembly and the indication of the molding parameter is an indication of a pressure of a molding material.

18. The control structure of claim 1 wherein the indication of the molding parameter indirectly appreciated by the controller includes a viscosity of the molding material.

19. A method executable in a controller of a molding system for controlling the operation of the molding system, the method comprising:
executing a control sequence to control a valve actuator that selectively positions a valve member of a valve for regulating flow of molding material in the molding system to maintain at least one of the valve actuator and the valve member in a selected condition;
while maintaining the at least one of the valve actuator and the valve member in the selected condition, monitoring an operating parameter of the valve actuator;
indirectly appreciating an indication of a molding parameter of the molding system on the basis of the operating parameter of the valve actuator, wherein indirectly appreciating the indication of the molding parameter comprises correlating changes in the operating parameter of the valve actuator to changing forces acting on the valve member; and
controlling a controllable device of the molding system on the basis of the indication of the molding parameter
wherein correlating a change in temperature of the valve actuator to heat generated as a result of an increase in actuation force/torque to undo a change in position and maintain position to evaluate the indication of the molding parameter.

20. The method of claim 19, wherein:
the controller is configured to control a controllable device that is associated with a molding material distributor of the molding system on the basis of the indication of the molding parameter;
the indication of the molding parameter relates to an indication of a temperature of the molding material; and
the controllable device is a thermal device that is associated with the molding material distributor, and wherein the controller is configured to control the thermal device for controlling the temperature of the molding material.

21. The method of claim 19, wherein:
the operating parameter of the valve actuator to be monitored by the controller with which to indirectly appreciate the indication of the molding parameter includes a position of a driving member of the valve actuator, and wherein the method further comprises:
correlating a change in position of the driving member to changing forces acting on a valve member that is connected to the driving member and further evaluating a change in one or more of pressure and temperature of the molding material based on the correlation; and
calculating a derivative of one or more of a velocity, integrated position error of the valve member to evaluate the indication of the molding parameter.

22. The method of claim 19, further comprising:
monitoring one or more operating parameters of a plurality of valve actuators with which to indirectly appreciate a plurality of indications of molding parameters within a plurality of mold cavities.

23. The method of claim 19 wherein the control sequence is configured to maintain the valve member in a selected position within an acceptable tolerance.

24. The method of claim 23 wherein the monitored operating parameter is a movement of the valve member and wherein the indication of the molding parameter is an indication of pressure acting on the valve member.

25. The method of claim 19 wherein the control sequence is configured to maintain the valve actuator in a condition of applying a selected force, within an acceptable tolerance, to the valve member.

26. The method of claim 25 wherein the monitored operating parameter is an output of an encoder assembly and the indication of the molding parameter is an indication of a pressure of a molding material.

27. The method of claim 19 wherein the indication of the molding parameter indirectly appreciated includes a viscosity of the molding material.

* * * * *

(12) SUPPLEMENTAL EXAMINATION CERTIFICATE
United States Patent
Weatherall et al.

(10) Number: US 10,201,922 F1
(45) Certificate Issued: Sep. 4, 2020

Control No.: 96/000,335

Filing Date: Aug. 7, 2020

Primary Examiner: Jeffrey D. Carlson

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| JP | 2004-174991 A | 6/2004 |
| JP | 11-309757 A | 11/1999 |
| JP | 62-268620 A | 11/1987 |